United States Patent [19]

Fishbein et al.

[11] 4,010,468

[45] Mar. 1, 1977

[54] METHODS AND APPARATUS FOR ELIMINATING INTERFERENCE IN RADAR SYSTEMS

[75] Inventors: William Fishbein, Elberon; Reinhard Olesch, Englishtown; Otto Rittenbach, Neptune, all of N.J.

[73] Assignee: The United States of America as represented by the Secretary of the Army, Washington, D.C.

[22] Filed: Oct. 10, 1975

[21] Appl. No.: 621,260

[52] U.S. Cl. ............................. 343/7.5; 343/5 R; 343/17.1 R

[51] Int. Cl.² ................... G01S 7/28; G01S 9/02

[58] Field of Search ............... 343/5 R, 17.1 R, 7.5

[56] References Cited
UNITED STATES PATENTS

| | | | |
|---|---|---|---|
| 3,222,672 | 12/1965 | Forestier | 343/7.5 |
| 3,412,396 | 11/1968 | Mooney, Jr. | 343/5 R |
| 3,911,432 | 10/1975 | Williams | 343/17.1 R X |
| 3,943,509 | 3/1976 | Pudsey | 343/7.5 X |

*Primary Examiner*—Malcolm F. Hubler
*Attorney, Agent, or Firm*—Nathan Edelberg; Sheldon Kanars; Edward Goldberg

[57] ABSTRACT

Interference between two or more radar systems operating on the same frequency is eliminated by synchronizing the rotation of the scanning antennas. In another embodiment, each transmitter is blanked if the corresponding receiver detects an interfering signal from the other transmitter. In yet another embodiment, the transmitter pulses are not blanked but merely delayed, if a pulse is received from the interfering system.

9 Claims, 5 Drawing Figures

METHODS AND APPARATUS FOR ELIMINATING INTERFERENCE IN RADAR SYSTEMS

GOVERNMENT LICENSE

The invention described herein may be manufactured and used by or for the Government for governmental purposes without the payment of any royalties thereon or therefor.

BACKGROUND OF THE INVENTION a. Field of the Invention

Broadly speaking, this invention relates to radar. More particularly, in a preferred embodiment, this invention relates to methods and apparatus for preventing interference between radar systems illuminating a common target.

b. Discussion of the Prior Art

From time to time, it becomes necessary to physically locate two or more radar systems in spatial proximity to one another. In a fixed installation, interference between the systems is minimized by assigning each system to a different operating frequency. However, where the radar systems are mobile, for example in a tactical military situation, or where frequency congestion makes the assignment of different operating frequencies impossible, interference between the systems is unavoidable.

Actually, there are two situations where interference of this type may arise. The first is where each antenna can physically "see" the other; this is by far the worst case. The other situation is where the two radars are masked from one another, for example, by some intervening hill or building, but they both illuminate some common target.

SUMMARY OF THE INVENTION

Fortunately, both the above problems have been solved by the instant invention which, in a preferred embodiment, comprises apparatus for eliminating interference between radar systems operating on a common frequency and which have at least one mutual target. Each radar system includes a transmitter and a receiver coupled by a circulator to a rotatable antenna. The apparatus further includes a clock circuit and means, coupled to the output of the clock, for rotating the antenna at a predetermined scanning rate. The apparatus also includes means, connected between the clock and the rotating means, for retarding or advancing the phase of the rotating antenna relative to the phase of the rotating antenna of the radar system tending to cause the interference.

The invention and its mode of operation will be more fully understood from the following detailed description when taken with the appended drawings in which:

DETAILED DESCRIPTION OF THE INVENTION

Figure 1:
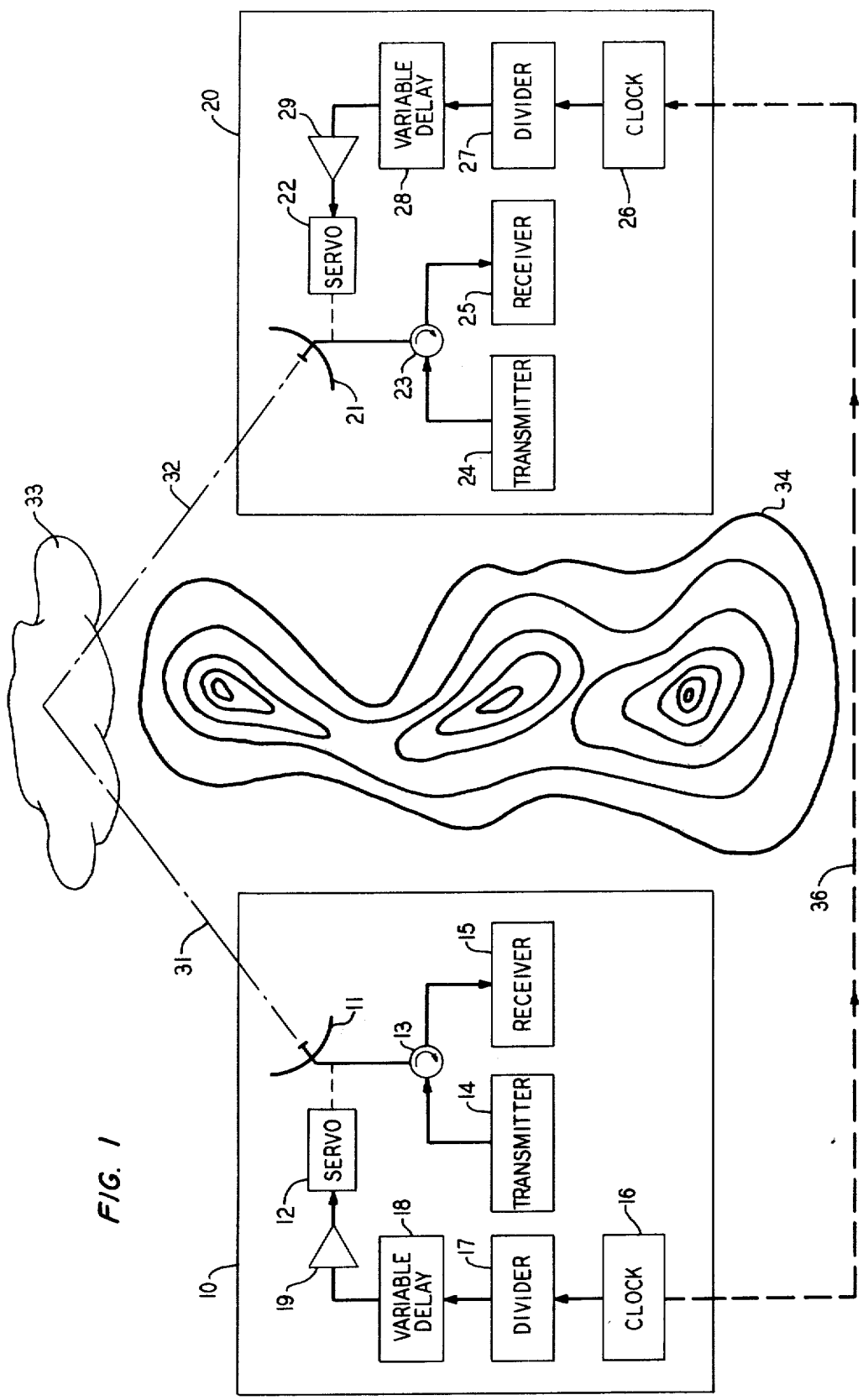
FIG. 1 is a block schematic diagram of an illustrative radar system according to the invention.

FIG. 1 depicts the situation where two radar systems are shielded from each other yet co-interfere because they illuminate a mutual target. As shown, radar system 10 comprises a rotatable antenna 11 driven by a servomotor 12. The antenna is connected to a circulator 13, thence to a radar transmitter 14 and receiver 15. A clock circuit 16 is connected to a frequency divider 17, thence to servomotor 12 via a variable delay line 18 and an amplifier 19.

In like manner, radar system 20 comprises a rotatable antenna 21, a servomotor 22, a circulator 23, a transmitter 24, a receiver 25, a clock 26, a divider 27, a delay line 28 and an amplifier 29, all interconnected as described with reference to radar system 10.

The beam 31 from antenna 11 and the beam 32 from antenna 21 both illuminate a common target 33 but, due to presence of hill 34, do not directly illuminate the antenna in the corresponding system. This, of course, assumes that both antennas are oriented to generate beams which are substantially parallel to the surface of the ground, that is, that the subject radar systems are not skyward-looking.

If both radar systems were conventional, the scanning rates of their antennas would be random and at least part of the time radar receiver 15 would be detecting a signal generated by radar transmitter 24 and vice versa. However, according to the invention, the scanning rates of the two antennas are synchronized so that antenna 11 is never pointing in the direction of target 33 at the same time that antenna 21 is, and vice versa.

It will be seen that servomotor 12 is driven by the delayed and amplified output of divider 17 which, in turn, is driven by the output of clock 16. A similar arrangement exists with respect to radar system 20. Thus, if both clocks are highly stable, for example, quartz crystal oscillators maintained in a temperature controlled environment, the rotation of each antenna will also be stable and a fixed phase difference may be established between them, which phase difference will also be highly stable.

In operation, once the operator of either radar system detects that he is picking up interference from another radar system operating on the same frequency, he temporarily disconnects his transmitter and by the use of some convenient recorder, for example, a strip recorder, plots the relationship of the interfering signal to the angular rotation of his antenna. It is then a simple matter to adjust the variable delay circuit to advance or retard the rotation of his antenna relative to the rotation of the antenna producing the interference.

As discussed, because of the extreme stability of clocks 16 and 17, the phase relationship between rotating antennas 11 and 21 will also be stable, thus minimizing interference between the systems. If extreme accuracy is required, or where the systems must operate over very long periods of time, the optional connection 36 may be made to synchronize the clocks. Such a connection could be made, for example, via some suitable land line. It will be seen that under these circumstances one of the clocks is redundant and could be eliminated. Or, once each day, both clocks could be adjusted by reference to some common time standard.

The situation becomes more complicated when the obstruction between the two systems is not present because, even if the relative phase difference between the antennas is set to 0°, it is quite likely that considerable interference will be experienced. That is to say, even when the first antenna is pointing directly at the rear of the second antenna, there will generally be sufficient leakage in and around the second antenna to cause an interfering signal to be picked up from the first antenna.

Figure 2:
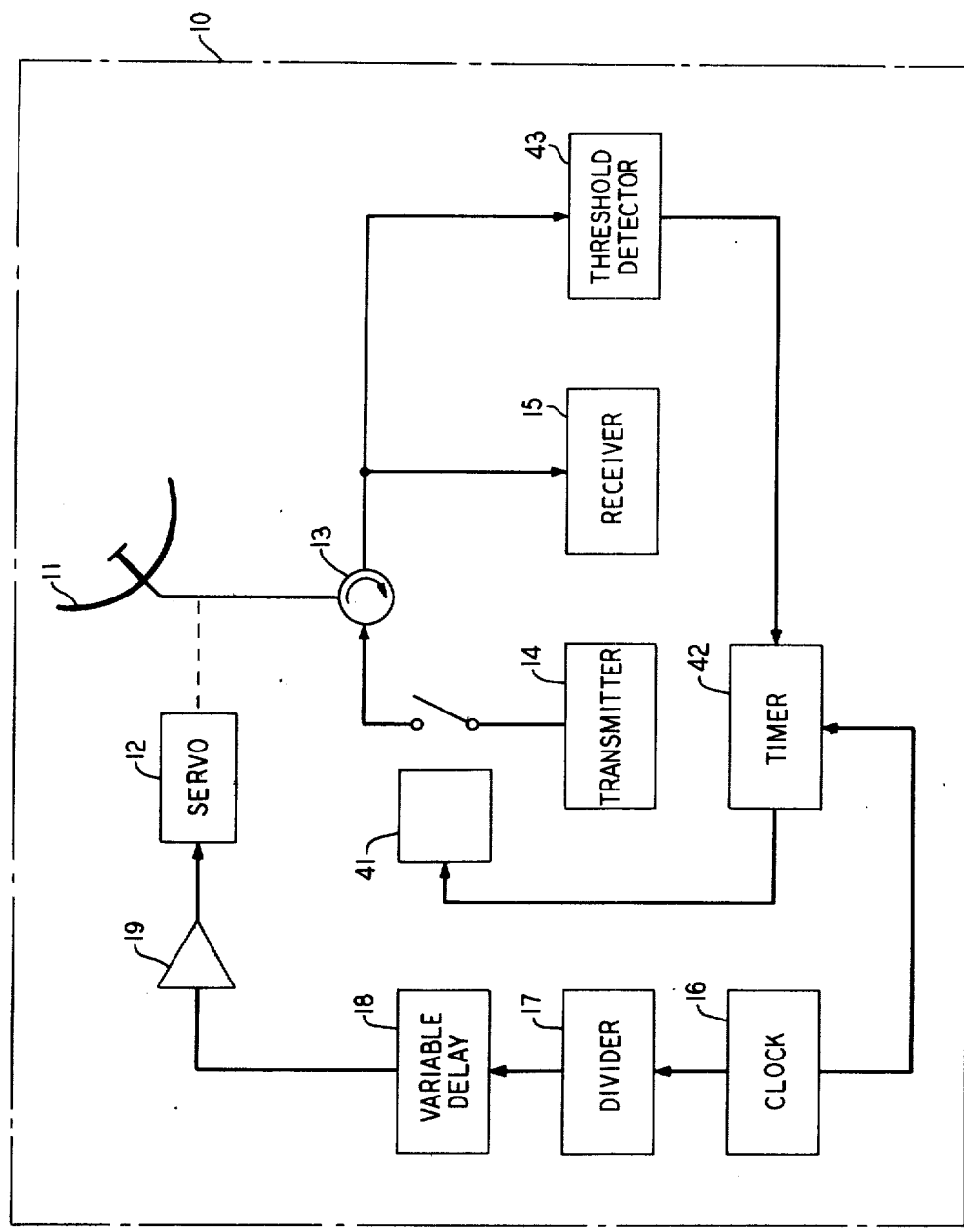
FIG. 2 is a block schematic diagram of an alternative transmitter-receiver arrangement for use in the apparatus shown in FIG. 1.

FIG. 2 depicts a modification of FIG. 1 which overcomes this problem. As shown, radar system 10 is modified by the provision of a switch or relay 41 connected between the output of transmitter 14 and circulator 13. Switch 14 is activated by the output of a timer circuit 42 which is connected to clock 16. Timer 42, in turn, is activated by a threshold detector 43 connected to the receiver side of circulator 13.

Figure 3:
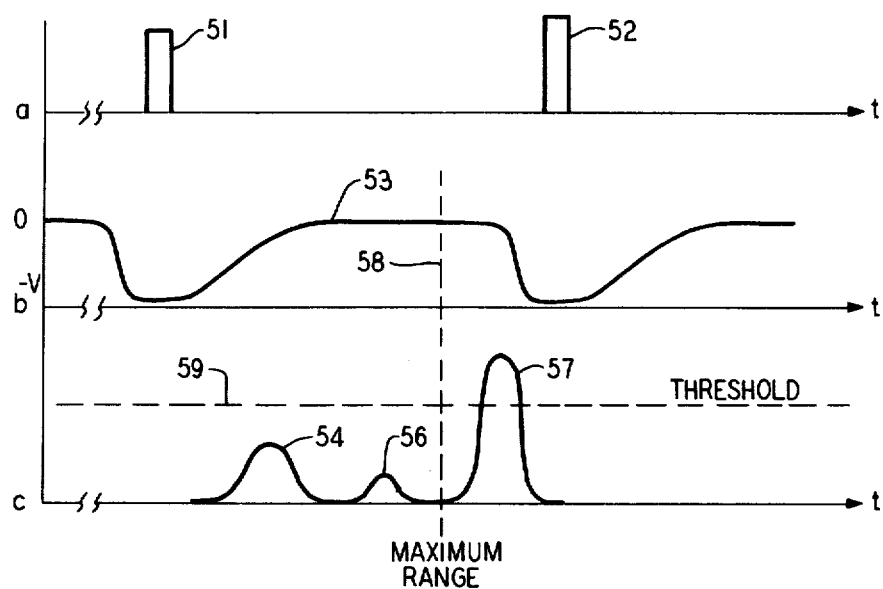
FIG. 3 is a graph depicting various waveforms found in the circuitry shown in FIG. 2.

Operation of the system, shown in FIG. 2, is best explained by reference to FIG. 3. As shown in graph $a$, 51 and 52 are two successive transmitter pulses out of the ten thousand or so pulses transmitted during each revolution of the antenna.

Graph $b$ shows the receiver a.g.c. 53 and, as shown, the a.g.c. level is high when pulses 51 and 52 are transmitted but falls off immediately thereafter to permit the receiver to detect echoes from the transmitted pulses. Graph $c$ shows two echoes 54 and 56, caused by pulse 51 as well as a larger signal 57 which is not a true echo but an interfering signal from the second radar.

Line 58 represents the maximum range of the radar and, ordinarily, the a.g.c. 53 would rise after line 58 has been passed; however, here it continues at its low level until just before the next transmitter pulse. If the amplitude of signal 57 exceeds the threshold 59 of detector 43 and occurs in the interval between the maximum range line 58 and the beginning of pulse 52, it can only be an interfering pulse and not a true echo; accordingly, threshold detector 43 activates switch 41 and, in addition, starts timer 42 counting the pulses from clock 16. Switch 41, activated, opens the path from transmitter 14 to the antenna so that pulse 52, and all that follow it, are never actually transmitted. Timer 42 is set to count down the number of clock pulses which correspond to one complete revolution of the antenna. When this count is reached, switch 41 is closed, reconnecting transmitter 14 to the antenna and resetting timer 42.

An identical arrangement is, of course, provided at the second radar system (not shown). Thus, when system 10 resumes transmitting the transmitter at the second radar will be cut off and this will continue back and forth between the radars. On the average then, each system will be transmitting for 50 percent of the time. When more than two radars are present, the situation is more complicated but at no time should more than one transmitter be transmitting since each receiver will cause its associated transmitter to shut down when it senses that another transmitter is already transmitting. In other words, the system is completely self-synchronizing.

Of course, there may exist some situations where it simply is not feasible to stop transmitting for one entire revolution of the antenna. For example, where the target information is changing rapidly as in an aircraft surveillance system.

Figure 5:
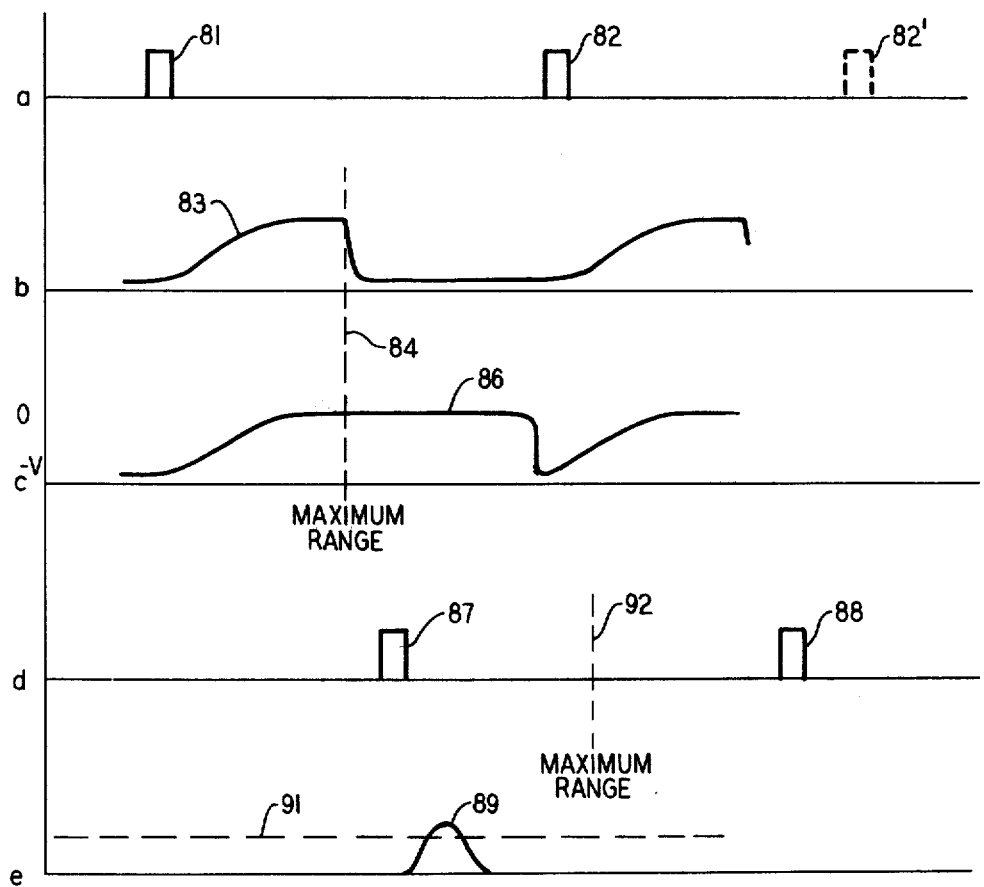
FIG. 5 is a graph depicting various waveforms to be found in the circuitry shown in FIG. 4.
Figure 4:
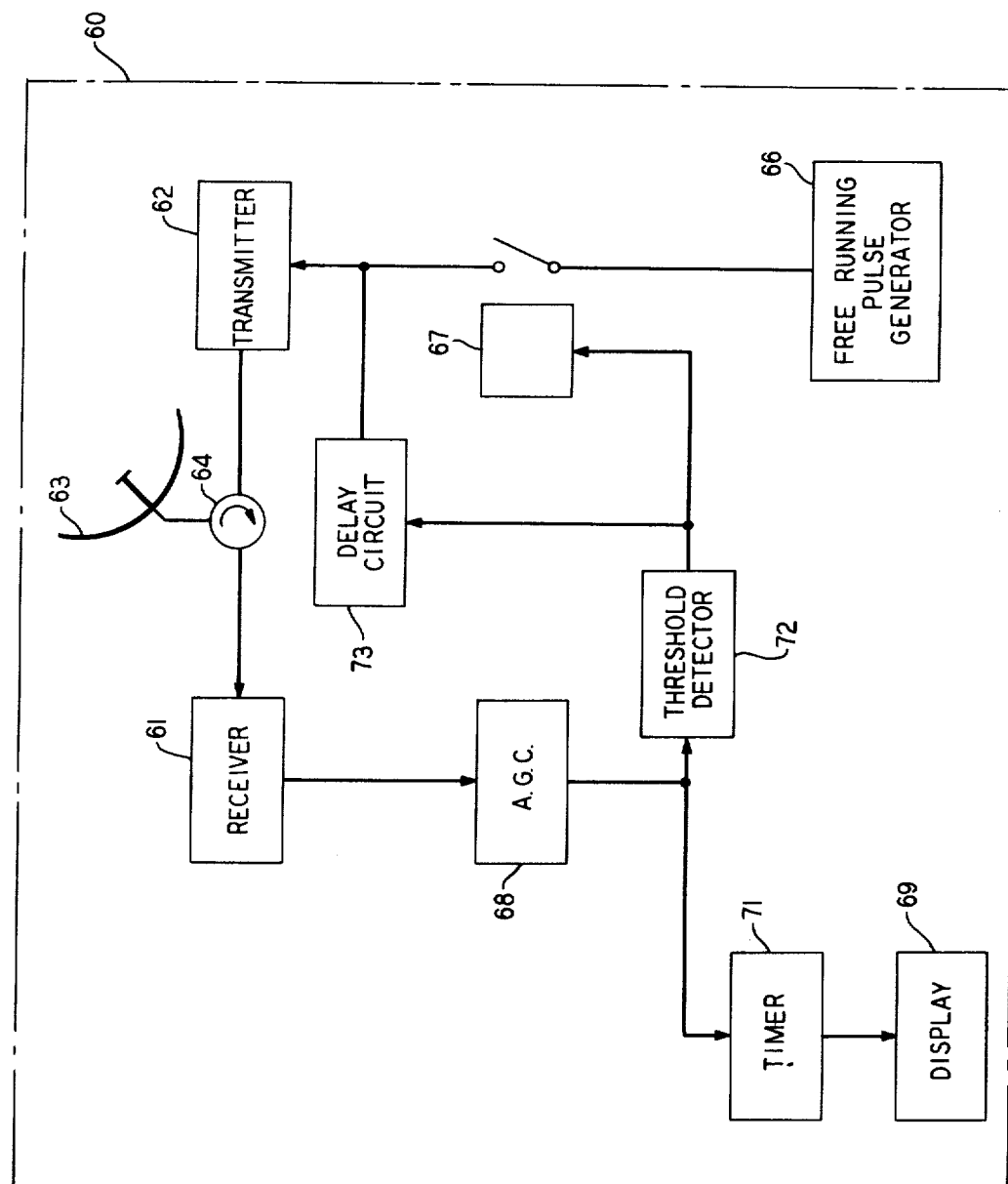
FIG. 4 is a block schematic diagram of yet another embodiment of the invention.

To that end, FIG. 4 depicts another embodiment of the invention wherein pulse-to-pulse synchronization rather than rotation-to-rotation synchronization is achieved. As shown, radar system 60 includes a receiver 61 and a transmitter 62 coupled to an antenna 63 via a circulator 64. Transmitter 62 is triggered by the output of a free-running pulse generator 66, via normally closed electronic switch 67. An a.g.c. circuit 68 connected to receiver 61 controls a display device 69, via a timing circuit 71, and also is connected to the input of a threshold detector 72. The output of threshold detector 72 is connected, via a delay circuit 73, to the trigger input of transmitter 62. The operation of system 60 is best illustrated with reference to FIG. 5. In graph $a$, 81 and 82 represent pulses from transmitter 62 which are generated in response to pulses from generator 66. Line 83 in graph $b$ represents the output of a.g.c. circuit 68 after passage through timer circuit 71 which raises the a.g.c. voltage to cut-off display 69 at the maximum range point, line 84 in graph $b$.

Line 86 in graph $c$ represents the a.g.c. voltage as it is applied to threshold detector 72 and, as will be noted, this voltage does not rise until just before generation of the pulse 82. In graph $d$, 87 and 88 represent pulses from the distant radar system and pulse 89 in graph $e$ represents pulse 87 as it might be received in receiver 61.

If pulse 89 exceeds the threshold level 91 of detector 72 switch 67 is opened, interrupting the train of pulses from generator 66. Thus, pulse 82 will not be generated. On the other hand, pulse 89 will pass through delay circuit 73 to itself trigger transmitter 62 which, in response, will generate pulse 82'. The time difference between pulse 82' and pulse 89 equals the interval between pulses 81 and 82, for example. Note that pulse 82' occurs after the maximum range line 92 of the distant radar system (see graph 5$d$. Thus, pulse 82' should not appear on the display of the second radar as the display at this time will be blanked by the a.g.c. voltage.

After pulse 82' has been generated, switch 67 closes and normal pulse generation resumes, unless of course another interfering pulse is received from the second radar in which event, the next pulse from transmitter 62 will again be delayed.

Since the second radar system is identical to that shown in FIG. 4, it too will delay its scanning pulses if, for example, pulse 82', or any pulse subsequent thereto, generates an interfering signal in its receiver.

Thus, without substantially degrading the quality of the image displayed on the display devices, pulse-to-pulse synchronization is automatically achieved and interference between the two systems is substantially eliminated.

Of course, by analogy to the scheme shown in FIG. 1, if the clocks are extremely stable or have a common reference, the transmitter pulses could be pre-programmed to alternate back and forth between the systems.

One skilled in the art can make various substitutions and changes to the arrangement of parts and circuitry shown without departing from the spirit and scope of the invention.

What I claim is:

1. Apparatus for eliminating interference between radar systems operating on a common frequency and having at least one mutual target, each radar system including a transmitter and a receiver coupled by a circulator to a rotatable antenna, the apparatus comprising:
   a clock;
   means, coupled to the output of said clock, for rotating said antenna at a predetermined rate; and means, connected between said clock and said rotating means, for retarding or advancing the phase of said rotating antenna relative to the phase of the rotating antenna of the radar system tending to cause said interference.

2. The apparatus according to claim 1 including a frequency divider connected to the output of said clock, said rotating means including an amplifier and a servomotor coupled to said antenna.

3. The apparatus according to claim 2 wherein said retarding means comprises a variable delay circuit.

4. The apparatus according to claim 1 wherein said clock, retarding means, and rotating means are provided at both the interfering and interfered with radar systems, and the apparatus further comprises:
   means for synchronizing the clock at the interfering system with the clock at the interfered-with system.

5. The apparatus according to claim 1, further including:
   means, connected to the receiver side of said circulator, for detecting incoming interference pulses which exceed a preset threshold; and
   means, responsive to the output of said detecting means, for interrupting the connection between said transmitter and said antenna for at least one full revolution of said antenna.

6. The apparatus according to claim 5 wherein said interrupting means comprises:
   a switch connected between the output of said transmitter and said circulator; and
   a timing circuit, connected to the output of said clock circuit, and activated by the output of said detecting means, for opening said switch for a predetermined number of clock pulses.

7. Apparatus for eliminating interference between radar systems operating on a common frequency, each radar system including a transmitter and a receiver coupled by a circulator to a rotatable antenna, said apparatus comprising;
   means connected to said receiver for detecting an interfering pulse which exceeds a preset threshold; and
   means connected to said detecting means for delaying the generation of the output pulse from said transmitter next following receipt of said interfering pulse, said delaying means including
   a free-running pulse generator connected to the triggering input of said transmitter,
   a normally-closed switch means interposed between said pulse generator and said transmitter and responsive to the output of said detecting means for interrupting said pulse generator upon occurrence of said interfering pulse exceeding said threshold, and
   a delay circuit connected between the output of said detector and the triggering input of said transmitter.

8. The apparatus according to claim 7
   including automatic gain control means connected between said receiver and said detecting means.

9. The apparatus according to claim 8 including timing means connected to said automatic gain control means and to said detecting means, and display means connected to said timing means.

* * * * *